(12) United States Patent
Kim

(10) Patent No.: US 8,489,509 B2
(45) Date of Patent: Jul. 16, 2013

(54) METHOD FOR PROCESSING RIGHTS OBJECT IN DIGITAL RIGHTS MANAGEMENT SYSTEM AND METHOD AND SYSTEM FOR PROCESSING RIGHTS OBJECT USING THE SAME

(75) Inventor: Jea-Un Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1674 days.

(21) Appl. No.: 11/192,527

(22) Filed: Jul. 29, 2005

(65) Prior Publication Data

US 2006/0031164 A1    Feb. 9, 2006

Related U.S. Application Data

(60) Provisional application No. 60/591,862, filed on Jul. 29, 2004.

(30) Foreign Application Priority Data

Aug. 13, 2004 (KR) .................. 10-2004-0063925

(51) Int. Cl.
*G06Q 99/00* (2006.01)

(52) U.S. Cl.
USPC ........................ 705/52; 705/50; 705/51

(58) Field of Classification Search
USPC .................. 705/1, 5, 50–58, 51–52
See application file for complete search history.

(56) References Cited

U.S. PATENT DOCUMENTS

| | | | | |
|---|---|---|---|---|
| 5,210,741 A | * | 5/1993 | Grochmal | 370/362 |
| 5,629,980 A | * | 5/1997 | Stefik et al. | 705/54 |
| 5,963,915 A | * | 10/1999 | Kirsch | 705/26.8 |
| 6,009,401 A | | 12/1999 | Horstmann | |
| 6,920,567 B1 | * | 7/2005 | Doherty et al. | 726/22 |
| 7,013,290 B2 | * | 3/2006 | Ananian | 705/26.42 |

(Continued)

FOREIGN PATENT DOCUMENTS

| | | |
|---|---|---|
| JP | 2002-006859 | 1/2002 |
| JP | 2002-352103 | 12/2002 |

(Continued)

OTHER PUBLICATIONS

DRM Specification Candidate Version 2.0—Jul. 16, 2004, Open Mobile Alliance OMA-DRM-DRM-V2_0-20040716-C, 142 pages.*

(Continued)

*Primary Examiner* — James D Nigh
(74) *Attorney, Agent, or Firm* — Lee, Hong, Degerman, Kang & Waimey

(57) ABSTRACT

A message, method and system for processing rights object (RO) in a DRM system are disclosed. A message for requesting submission or return of an unused/partially consumed rights object (RO) is newly defined. When an authenticated device generates such a request message and transmits it to a right issuer (RI), the RI checks whether there exists an ID of a receiving device in the request message. If an ID of a receiving device exists in the request message, the RI performs a procedure for submitting the RO to the ID of the receiving device. If, however, the ID of the receiving device does not exist, the RI performs a procedure of returning of the RO or issuing of a different RO. Accordingly, the unused RO or partially consumed RO can be returned or submitted to a different device by using the request message.

25 Claims, 11 Drawing Sheets

U.S. PATENT DOCUMENTS

| | | | |
|---|---|---|---|
| 7,415,439 B2* | 8/2008 | Kontio et al. | 705/53 |
| 2002/0080810 A1* | 6/2002 | Casais | 370/428 |
| 2003/0028451 A1* | 2/2003 | Ananian | 705/27 |
| 2003/0046678 A1* | 3/2003 | Boxall et al. | 717/174 |
| 2003/0097299 A1* | 5/2003 | O'Kane et al. | 705/14 |
| 2003/0110126 A1* | 6/2003 | Dunkeld et al. | 705/39 |
| 2004/0030898 A1* | 2/2004 | Tsuria et al. | 713/171 |
| 2004/0249768 A1* | 12/2004 | Kontio et al. | 705/65 |
| 2004/0253942 A1* | 12/2004 | Mowry et al. | 455/410 |
| 2005/0149751 A1* | 7/2005 | Ochi et al. | 713/200 |
| 2005/0172127 A1* | 8/2005 | Hartung et al. | 713/167 |
| 2006/0150180 A1* | 7/2006 | Schmidt et al. | 717/173 |
| 2007/0288387 A1* | 12/2007 | Park et al. | 705/59 |

FOREIGN PATENT DOCUMENTS

| | | |
|---|---|---|
| JP | 2003-006456 | 1/2003 |
| JP | 2003-058657 | 2/2003 |
| JP | 2003-162600 | 6/2003 |
| JP | 2003-233690 | 8/2003 |
| JP | 2003-248738 | 9/2003 |
| JP | 2004-013568 | 1/2004 |
| JP | 2004-032220 | 1/2004 |
| JP | 2004-157582 | 6/2004 |
| JP | 2004-164299 | 6/2004 |
| JP | 2004-185152 | 7/2004 |
| WO | WO 00/59185 | 10/2000 |
| WO | WO 02/06931 A2 | 1/2002 |
| WO | WO 03/058537 A1 | 7/2003 |
| WO | WO 2004053640 A2 * | 6/2004 |
| WO | WO2004053640 A2 * | 6/2004 |

OTHER PUBLICATIONS

OMA-DLDRM-2004-0155-SubmitRO, Submitted to DLDRM, Aug. 4, 2004, 6 pages.*

DRM Specification Candidate Version 2.0—Jul. 16, 2004 Open Mobile Alliance OMA-DRM-DRM-V2_0-20040716-C, 142 pages, hereinafter referred to as DRM.*

(DRM Specification Candidate Version 2.0—Jul. 16, 2004 Open Mobile Alliance Oma-Drm-Drm-V2_0-20040716-C, 142 pages.*

DRM Specification Candidate Version 2.0—Jul. 16, 2004 Open Mobile Alliance OMA-DRM-DRM-V2_0-20040716-C, 142 pages.*

* cited by examiner

FIG. 2

```xml
<!--Used in ROAP-Submit Request message-->
<complexType name="RedirectIdentifier">
  <complexContent>
    <extension base="roap:Extension"/>
      <sequence minOccurs="0">
        <element name="id" type="string"/>
      <minLength value="12"/>
      </sequence>
    </extension>
  </complexContent>
</complexType>

<!--ROSubmitRequest-->

<element name="roSubmitRequest" type="roap:ROSubmitRequest"/>

<complexType name="ROSubmitRequest">
  <annotation>
    <documentation xml:lang="en">
      Message sent from Device to RI to request submit RO (partially consumed).
    </documentation>
  </annotation>
  <complexContent>
    <extension base="roap:Request">
      <sequence>
<element name="deviceID" type="roap:identifier"/>
        <element name="riID" type="roap:Identifier"/>
        <element name="nonce" type="roap:Nonce"/>
        <element name="protectRO" type="roap:rights"/>
        <element name="certificateChain" type=roap:CertificateChain" minOccurs="0"/>
        <element name="extensions" type="roap:Extensions" minOccurs="0"/>
        <element name="signature" type="base64Binary"/>
      </sequence>
    </extension>
  </complexContent>
</complexType>
```

FIG. 3

```
<element name="roSubmitResponse" type="roap:ROSubmitResponse"/>
<complexType name="ROSubmiResponse">
  <annotation>
   <documentation xml:lang="en">
   Message sent from RI to Device in response to a ROSubmit.
   </documentation>
  </annotation>
<complexContent>
   <extension base="roap:Response">
   <sequence minOccurs="0">
    <element name="deviceID" type="roap:Identifier"/>
    <element name="riID" type="roap:Identifier"/>
    <element name="nonce" type="roap:Nonce" minOccurs="0"/>
    <element name="signature" type="base64Binary"/>
   </sequence>
   </extension>
</complexContent>
</complexType>
```

FIG. 4A

```xml
<?xml version="1.0" encoding="utf-0"?>
<roap: roSubmitRequest
 xmlns: roap="urn: oma: bac: dldrm: roap-1.0"
 xmlns: xsi="http://www.w3.org/2001/XMLSchema-instance">
  <deviceID>
    <keyIdentifier xsi: type="roap: X509SPKIHash">
      <hash>vXENc+Um/9/NvmYKiHDLaErK0gk=</hash>
    </keyIdentifier>
  </deviceID>
  <riID>
    <keyIdentifier xsi: type="roap: X509SPKIHash">
      <hash>aXENc+Um/9/NvmYKiHDLaErK0fk=</hash>
    </keyIdentifier>
  </riID>
<nonce>32efd34de39sdwefqwer</nonce>
<protectedRO>
  <ro id="n8yu98hy0e2109eu09ewf09u" stateful="true" version="1.0">
    <riID>
    <keyIdentifier xsi: type="roap: X509SPKIHash">
      <hash>aXENc+Um/9/NvmYKiHDLaErK0fk=</hash>
    </keyIdentifier>
  </riID>
      <rights o-ex: id="REL1">
      <o-ex: context>
        <o-dd: version>2.0</o-dd: version>
        <o-dd: uid>RightsObjectID</o-dd: uid>
      </o-ex: context>
      <o-ex: agreement>
       <o-ex: asset>
        <o-ex: context>
          <o-dd: uid>ContentID</o-dd: uid>
        </o-ex: context>
        <o-ex: digest>
            <ds: DigestMethod Algorithm="http://www.w3.org/2000/09/xmldsig#sha1"/>
            <ds: DigestValue>bLLLc+Um/5/NvmYKiHDILaErK0fk=</ds: DigestValue>
          </o-ex: digest>
        </o-ex: asset>
       </o-ex: permission>
         <o-dd: play/>
       </o-ex: permission>
      </o-ex: agreement>
    </rights>
```

FIG. 4B

```
<signature>
<ds:SignedInfo>
<ds:CanonicalizationMethod
Algorithm="http://www.w3.org/2000/10/xml-exc-c14n#"/>
  <ds:SignatureMethod
Algorithm="http://www.w3.org/2000/09/xmldsig#rsa-pss-default"/>
    <ds:Reference URI="#REL1">
    <ds:DigestMethod Algorithm="http://www.w3.org/2000/09/xmldsig#sha1"/>
    <ds:DigestValue>j6lwx3rvEP00vKtMup4NbeVu8nk=</ds:DigestValue>
    </ds:Reference>
    </ds:SignedInfo>
    <ds:SignatureValue>j6lwx3rvEP00vKtMup4NbeVu8nk=</ds:SignatureValue>
    <ds:KeyInfo>
    <roap:X509SPKIHash>
        <hash>aXENc+Um/9/NvmYKiHDLaErK0fk=</hash>
    </roap:X509SPKIHash>
    </ds:KeyInfo>
    </signature>
  </ro>
  </protectedRO>
<extensions>
    <extension xsi:type="roap:RedirectIdentifier">
        <id>093210932091</id>
    </extension>
  </extensions>
<signature>321ue3ue10ue2109ue1ueoidwoijdwe309u09ueqljdwqljdwq09uwqwqi009</signature>
</roap:roSubmitRequest>
```

FIG. 5

```
<?xml version="1.0" encoding="utf-8"?>
<roap: roSubmitResponse
  xmlns: roap="urn: oma: bac: dldrm: roap-1.0"
  xmlns: xsi=http://www.w3.org/2001/XMLSchema-instance
  status="success">
  <deviceID>
    <keyIdentifier xsi: type="roap:X509SPKIHash">
      <hash>vXENc+Um/9/NvmYKiHDLaErK0gk=</hash>
    </keyIdentifier>
  </deviceID>
  <riID>
    <keyIdentifier xsi: type="roap:X509SPKIHash">
      <hash>aXENc+Um/9/NvmYKiHDLaErK0fk=</hash>
    </keyIdentifier>
  </riID>
  <nonce>32efd34de39sdwefqwer</nonce>
  <signature>321ue3ue3ue10ue2109ue1ueoidwoijdwe309u09ueqijdwqijdwq09uwqwqi009</signature>
</roap: roSubmitResponse>
```

FIG. 6

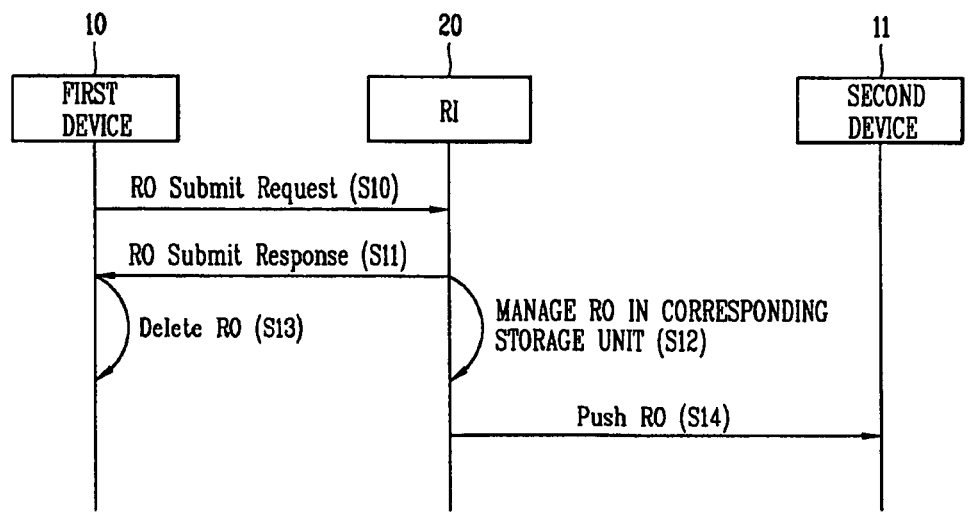

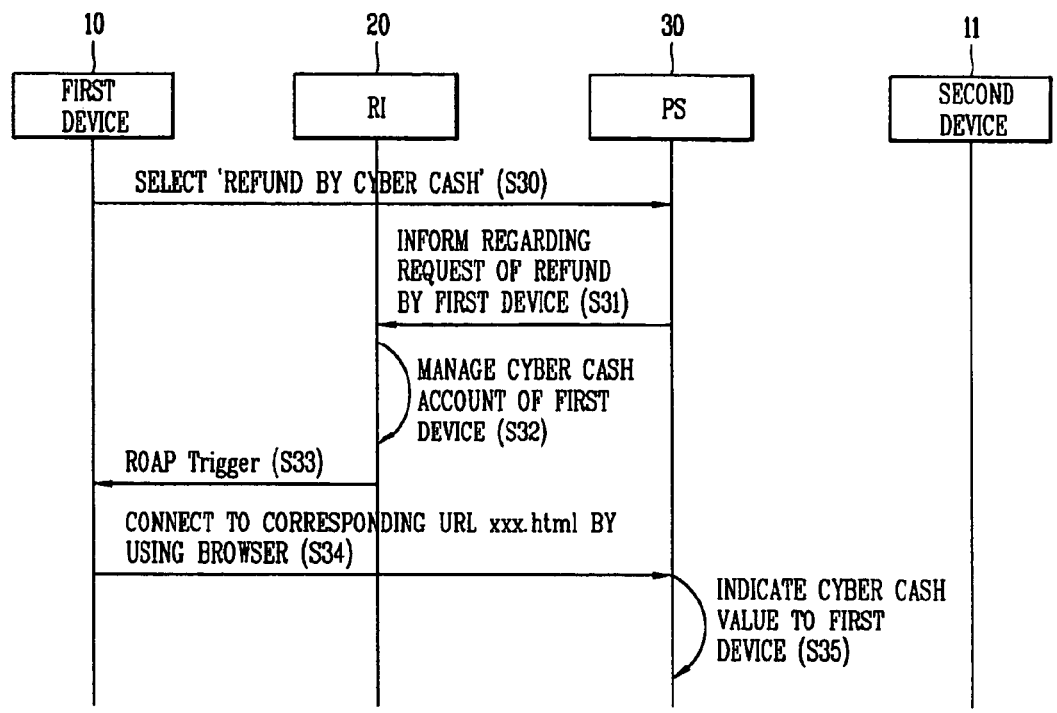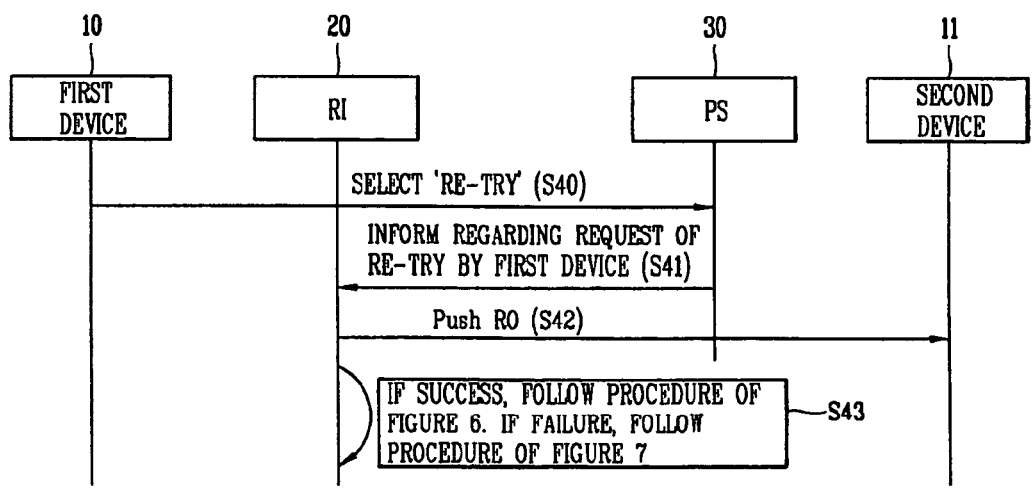

METHOD FOR PROCESSING RIGHTS OBJECT IN DIGITAL RIGHTS MANAGEMENT SYSTEM AND METHOD AND SYSTEM FOR PROCESSING RIGHTS OBJECT USING THE SAME

CROSS-REFERENCE TO RELATED APPLICATIONS

Pursuant to 35 U.S.C. § 119(a), this application claims the benefit of earlier filing date and right of priority to Korean Application No. 63925/2004, filed on Aug. 13, 2004 and pursuant to 35 U.S.C. § 119(e), this application claims the benefit of priority to provisional application 60/591,862, filed on Jul. 29, 2004, the contents of which are hereby incorporated by reference herein in their entirety:

BACKGROUND OF THE INVENTION

1. Field of the Invention

The present invention relates to a digital rights management (DRM) system and more particularly, to a message, method and system for processing rights objects (RO) in the DRM system.

2. Description of the Related Art

With increased Internet businesses related to online communities and electronic commercial transactions, most online contents providers provide various contents to generate draw users' interest. Such contents are mostly related to multimedia such as music, images, and video. Various types of multimedia data are provided including Internet broadcast, education, news, sports, and travel information consulting. These multimedia data create new services in virtual space.

Compared to existing analog contents, the digital multimedia contents have many advantages with respect to generation, processing, circulation and distribution. On the other hand, because a copy version of the original can easily be made, protecting the rights to digitally created products presents a problem.

The DRM system, which is a mechanism for protecting and systematically managing rights for digital assets, not only prevents piracy of contents, but also provides a protection and management system for generating, publishing, distributing and using contents. In the DRM system, digital contents exist in a coded state so that only an authenticated user may decode the contents for use and, even if contents are copied by a user, the user cannot use the contents unless the user is authenticated, thereby preventing illegal piracy.

The DRM system must continuously protect digital contents and apply various usage regulations related to the digital contents. Even if contents are based on the DRM technique, the contents must be able to accept the existing method of distributing and using digital information and a technical protection measure of the DRM should not cause inconvenience for users.

However, the conventional DRM system has drawbacks. For example, when an authenticated user desires to submit rights, via a rights object, that remain after using these rights related to issued digital contents or submit unused rights, via right objects, to a different user or the authenticated user desires to return the issued digital contents and obtain a refund of the cost or obtain a different RO, the user's request is not supported.

Therefore, there is a need for a system for facilitating the return of unused or partially used rights or the submission of unused rights or partially used rights to another user. The present invention addresses these and other needs.

SUMMARY OF THE INVENTION

The invention is directed to provide a message, system and method for facilitating the return or transfer of unused or partially used rights objects (RO) in a DRM system. The invention allows an authenticated user of RO related to digital contents to transfer those RO to another user, return the RO for a refund or exchange the RO for RO related to different digital contents.

In one embodiment of the present invention a system for processing access rights to digital contents in a DRM (Digital Rights Management) system is provided. The system comprises a first device adapted to generate and transmit a request message indicating a transaction to be performed on at least one rights object (RO) related to accessing the digital contents, a server adapted to receive the request message, determine the transaction, process the transaction and provide the digital contents to at least one of the first device and a second device, wherein the transaction comprises the transfer of the at least one RO to the second device.

It is further contemplated that the transaction further comprises the return of the at least one RO.

It is further contemplated that the server comprises a rights issuer (RI) adapted to receive the request message, determine the transaction and process the transaction.

It is further contemplated that the server further comprises a presentation server (PS) adapted to provide the digital contents to at least one of the first device and the second device according to the RI.

It is further contemplated that the request message is an RO submit request message.

It is further contemplated that the system comprises a contents issuer (CI) for supplying the digital contents.

It is further contemplated that the request message comprises an identifier of the first device transmitting the request message, an identifier of the RI to which the request message is transmitted and an identifier of the at least one RO.

It is further contemplated that the identifier of the at least one RO is a protected RO.

It is further contemplated that the request message further comprises an arbitrary value generated by the first device, an indicator of an authentication procedure and a digital signature.

It is further contemplated that the arbitrary value is a device nonce, the indicator of the authentication procedure is an authentication chain between the RI and PS and the digital signature comprises a PKI method.

It is further contemplated that the RI is further adapted to generate and transmit a response message to the first device, the response message indicating one of the success and the failure of the transaction.

It is further contemplated that the first device deletes the RO upon receiving a response message indicating a successful transaction.

It is further contemplated that the RI is further adapted to determine that the transaction is the transfer of the at least one RO to the second device if the request message comprises an identifier of the second device and to determine that the transaction is the return of the at least one RO if the request message does not comprise an identifier of the second device.

It is further contemplated that the RI transfers the at least one RO to the second device upon determining that the transaction is the transfer of the at least one RO to the second device.

It is further contemplated that the RI performs a procedure for returning the at least one RO upon determining that the transaction is the return of the at least one RO, the procedure performed in association with the PS.

It is further contemplated that the RI is further adapted to inform the PS regarding the transaction and the PS further adapted to generate and transmit a preparation message to the RI and, wherein the RI transmits a connection message to the first device upon receiving the preparation message from the PS, the connection message instructing the first device to connect to the PS in order to return the at least one RO.

It is further contemplated that the preparation message is a return service preparation completion report and the connection message is an ROAP (Right Object Acquisition Protocol) trigger.

It is further contemplated that the PS further adapted to provide at least one return option to the first device upon the first device connecting to the PS and to perform a process in association with the RI, the process related to an option selected by the first device.

It is further contemplated that the at least one return option comprises a cyber cash refund and issuance of at least one different RO.

In another embodiment of the present invention, a method for processing access rights to digital contents in a DRM (Digital Rights Management) is provided. The method comprises a first device transmitting a request message to a server, the request message indicating a transaction to be performed on at least one rights object (RO) related to accessing the digital contents and the transaction comprising the transfer of the at least one RO to a second device, the server analyzing the request message to determine the transaction and the server performing a procedure for transferring the at least one RO to the second device, the procedure performed according to the determined transaction.

It is further contemplated that the server comprises a rights server (RI).

It is further contemplated that the transaction further comprises the return of the at least one RO.

It is further contemplated that the request message is determined to be the transfer of the at least one RO to the second device if the response message comprises an identifier of the second device.

It is further contemplated that the procedure for transferring the at least one RO to the second device comprises the RI transmitting a response message to the first device, the first device deleting the at least one RO upon receiving the response message and the RI transmitting the at least one RO to the second device.

It is further contemplated that the method further comprises the RI determining that the RO cannot be successfully transferred to the second device, the RI transmitting a status message to the first device, the status message indicating that the transfer failed, the first device connecting to a presentation server (PS) using connection information included in the status message and the PS providing at least one return option to the first device.

It is further contemplated that the RI determines that the RO cannot be successfully transferred if one of the second device is in an OFF state, there is no response from the second device, and a response from the second device indicates that reception is not available.

It is further contemplated that the connection information in the status message comprises a URL address of the PS.

It is further contemplated that the at least one return option comprises at least two of a refund by cyber cash, re-trying the transfer, obtaining another RO, and withdrawal of the RO.

It is further contemplated that the method further comprises the PS performing a process in association with the RI, the process related to an option selected by the first device.

It is further contemplated that the method further comprises the RI determining that the second device does not have the digital contents corresponding to the at least one RO, the RI transmitting a registration message to the second device, the registration message instructing the second device to perform a registration procedure and the second device performing the registration procedure and receiving the at least one RO via a presentation server (PS).

It is further contemplated that the procedure for transferring the at least one RO to the second device comprises the RI successfully transferring the at least one RO to the second device, the RI transmitting a status message to the first device, the status message indicating that the transfer was successful and the first device deleting the at least one RO.

It is further contemplated that transmission of the request message from the first device to the RI, transfer of the at least one RO from the RI to the second device, and transmission of the status message from the RI to the first device are processed as a single transaction.

It is further contemplated that the request message is determined to be the return of the at least one RO if the response message does not comprise an identifier of the second device.

It is further contemplated that the procedure for returning the at least one RO comprises the RI informing a presentation server (PS) about the transaction, the PS generating and transmitting a preparation message to the RI, the preparation message indicating the PO is ready for return of the at least one RO and the RI transmitting a connection message to the first device, the connection message instructing the first device to connect to the PS in order to return the at least one RO.

It is further contemplated that the connection message is an ROAP trigger.

It is further contemplated that the procedure for returning the at least one RO further comprises the first device connecting to the PS, the PS providing at least one return option to the first device and the PS performing a process in association with the RI, the process related to an option selected by the first device.

It is further contemplated that the at least one return option comprises a refund by cyber cash and issuance of at least one different RO.

In another embodiment of the present invention, a message for requesting a transaction to be performed on at least one rights object (RO) related to accessing digital contents in a DRM (Digital Rights Management) system is provided. The message comprises an identifier of a first device requesting the transaction, an identifier of a server to which the message is transmitted and an identifier of the at least one RO.

It is further contemplated that the server comprises a rights issuer (RI).

It is further contemplated that the identifier of the at least one RO is a protected RO.

It is further contemplated that the message further comprises an arbitrary value generated by the first device, an indicator of an authentication procedure and a digital signature.

It is further contemplated that the arbitrary value is a device nonce, the indicator of the authentication procedure is an authentication chain between at least the RI and a presentation server (PS) and the digital signature comprising a PKI method.

It is further contemplated that the message further comprises an identifier of a second device to which the at least one RO is to be transferred.

It is further contemplated that the identifier of the first device comprises one of a phone number, a TMSI (Temporary Mobile Subscriber Identity), an IMSI (International mobile Subscriber Identity) and an IP address.

In another embodiment of the present invention, a message for indicating the status of a transaction requested on at least one rights object (RO) related to accessing digital contents in a DRM (Digital Rights Management) system is provided. The message comprises an identifier of a first device that requested the transaction, an identifier of a device transmitting the response message, status information indicating one of the success and the failure of the transaction, a domain ID, an arbitrary value, the arbitrary value obtained from a request message received from the first device and a digital signature.

In another embodiment of the present invention, a terminal for processing access rights to digital contents in a DRM (Digital Rights Management) system is provided. The terminal is adapted to generate and transmit a request message, the request message indicating a transaction to be performed on at least one rights object (RO) related to accessing the digital contents, wherein the transaction comprises the transfer of the at least one RO to a second terminal.

It is further contemplated that the transaction further comprises the return of the at least one RO to a server.

It is further contemplated that the terminal is further adapted to generate the request message comprising an identifier of the terminal, an identifier of a server and an identifier of the at least one RO.

It is further contemplated that the terminal is further adapted to generate the request message comprising an arbitrary value, an indicator of an authentication procedure to be performed by the server and a digital signature.

It is further contemplated that the terminal is further adapted to generate the request message comprising an identifier of the second terminal if the transaction is the transfer of the at the least one RO to the second terminal.

It is further contemplated that the terminal is further adapted to delete the at least one RO upon receiving a response message indicating that the transaction was successfully performed.

It is further contemplated that the terminal is further adapted to connect to the server in order to return the at least one RO upon receiving a connection message after transmitting a request message indicating that the transaction is the return of the at least one RO.

It is further contemplated that the terminal is further adapted to select a return option from at least one return option provided by the server.

It is further contemplated that the at least one return option comprises a cyber cash refund and issuance of at least one different RO.

It is further contemplated that the terminal is further adapted to connect to a server using connection information included in a received status message indicating that the transfer of the at least one RO to a second terminal was unsuccessful.

It is further contemplated that the terminal is further adapted to select a return option from at least one return option provided by the server.

It is further contemplated that the at least one return option comprises at least two of a refund by cyber cash, re-trying the transfer, obtaining another RO, and withdrawal of the RO.

In another embodiment of the present invention, a server for processing access rights to digital contents in a DRM (Digital Rights Management) system is provided. The server is adapted to manage at least one rights object (RO) related to accessing the digital contents and further adapted to analyze a request message received from a first terminal, the request message indicating a transaction to be performed on the at least one RO and transmit the at least one RO to a second terminal according to the indicated transaction.

It is further contemplated that the server is further adapted to process the return of the RO according to the indicated transaction.

It is further contemplated that the server is further adapted to determine that the transaction is the transfer of the at least one RO to the second terminal if the request message comprises an identifier of the second device.

It is further contemplated that the server is further adapted to determine that the transaction is the return of the at least one RO if the request message does not comprise an identifier of the second device.

It is further contemplated that the server is further adapted to generate and transmit a response message to the first device, the response message indicating one of the success and the failure of the transaction.

It is further contemplated that the server is further adapted to communicate with a presentation server (PS), the PS adapted to provide the digital contents to at least one of the first terminal and the second terminal.

It is further contemplated the server is further adapted to perform an authentication procedure in association with the PS according to an indicator in the request message.

It is further contemplated that the server is further adapted to inform the PS upon determining that the transaction is the return of the at least one RO and to generate and transmit a connection message to the first terminal upon receiving a preparation message from the PS, the connection message instructing the first terminal to connect to the PS in order to return the at least one RO.

It is further contemplated that the server is further adapted to transmit a status message to the first device upon determining that the transaction is the transfer of the at least one RO to the second terminal and that the at least one RO cannot be successfully transferred to the second terminal, the status message indicating that the transfer failed.

It is further contemplated that the server is further adapted to determine that the at least one RO cannot be successfully transferred if one of the second device is in an OFF state, there is no response from the second device, and a response from the second device indicates that reception is not available.

It is further contemplated that the server is further adapted to include connection information in the status message, the connection information comprising a URL address of a presentation server (PS).

It is further contemplated that the server is further adapted to transmit a registration message to the second device upon determining that the transaction is the transfer of the at least one RO to the second terminal and that the second device does not have the digital contents corresponding to the at least one RO, the registration message instructing the second device to perform a registration procedure.

It is further contemplated that the server is further adapted to receive the request message from the first terminal, transmit the at least one RO to the second terminal, and transmit a status message to the first terminal as part of a single transaction.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 2 illustrates a structure, content and syntax of an RO submit request message in accordance with one embodiment of the present invention.

FIG. 3 illustrates a structure, content and syntax of an RO submit response message in accordance with one embodiment of the present invention.

FIGS. 4A and 4B illustrate an RO submit request message coded using an XML (Extensible Markup Language).

FIG. 5 illustrates an RO submit response message coded using an XML.

FIG. 6 illustrates a method for submitting RO in the DRM system.

FIG. 8A illustrates a procedure when "REFUND BY CYBER CASH" is selected in FIG. 7.

FIG. 8B illustrates a procedure when a "RE-TRY" is selected in FIG. 7.

DETAILED DESCRIPTION OF THE PREFERRED EMBODIMENTS

The present invention relates to a message, method and system facilitating the return or transfer of unused or partially used rights objects (RO) in a DRM system. Although the present invention is illustrated with respect to RO in a DRM system, it is contemplated that the present invention may be utilized anytime it is desired to facilitate transactions related to digital contents.

Figure 1:
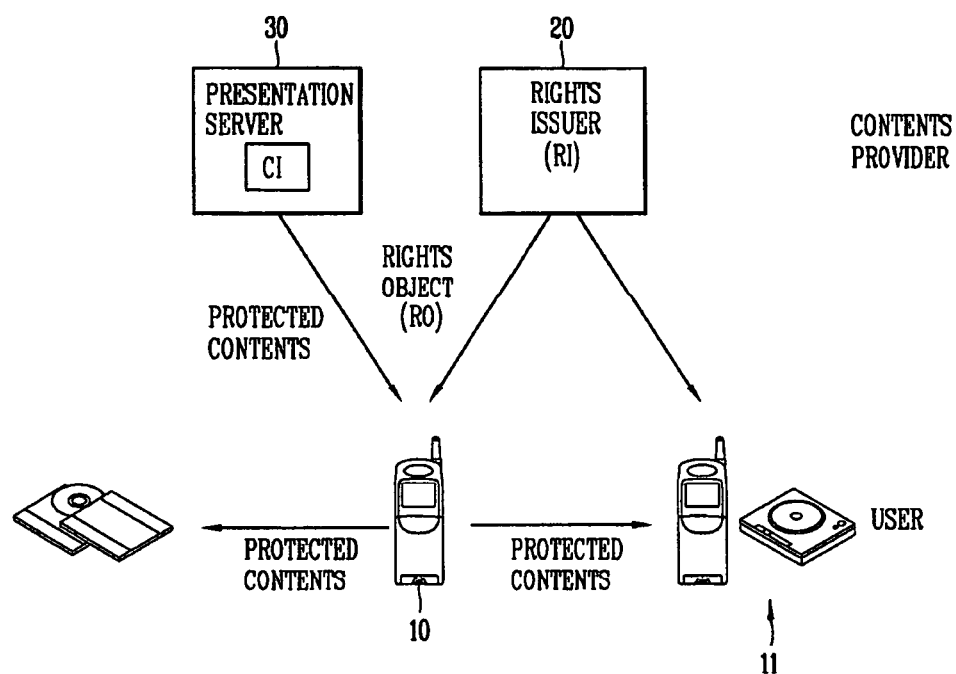
FIG. 1 illustrates a system for processing RO in a DRM system in accordance with one embodiment of the present invention.

FIG. 1 illustrates an example of a system for processing RO in a DRM system in accordance with one embodiment of the present invention.

As shown in FIG. 1, a system for processing RO in a DRM system includes a first device 10 for transmitting an RO submit request message with respect to digital contents, an RI (Rights Issuer) 20 for analyzing the RO submit request message and transferring RO, a second device 11 for receiving the RO from the RI 20 and a presentation server (PS) 30 for providing the digital contents to the first and second devices 10, 11 in association with the RI 20. The PS 30 may include a CI (Contents Issuer) for supplying the digital contents or may be operated in association with a CI.

When the first device 10 has received RO for digital contents from the RI 20, an RO submit request message is transmitted from the first device 10 to the RI 20 in order to request transfer of the unused RO or partially used RO to the second device 11 or to return the unused RO or the partially consumed to the RI 20. In response to the RO submit request message, an RO submit response message is transmitted from the RI 20 to the first device 10. The RO submit request message is defined with reference to Table 1. The RO submit request message includes parameters such as a Device ID, an RI ID, a Device nonce, Protected ROs, a Certificate chain, Extensions, and a Digital signature.

The Device ID identifies the device transmitting the RO submit request message. A phone number of the device may be used as the Device ID. Conversely, a TMSI (Temporary Mobile Subscriber Identity) or an IMSI (International Mobile Subscriber Identity) may be used as the Device ID for a GSM (Global System for Mobile) communication system and an IP (Internet Protocol) address may be used as the Device ID for an IPv6 system.

The RI ID identifies an RI to which the RO submit request message is transmitted. An arbitrary value generated by the Device may be used the Device nonce. The protected ROs, such as a coded RO, indicate RO to be submitted or returned. The Certificate Chain indicates an authentication procedure to be performed. The Extensions indicate information added to the RO submit request message. A PKI (Public Key Infrastructure) method may be used as the digital Signature.

FIG. 2 illustrates a structure, content and syntax of an RO submit request message in accordance with one embodiment of the present invention. The Certificate Chain and Extensions parameters shown in Table 1 are selectively included in the RO submit request message.

In order to indicate that the RO submit request message is requesting transfer of RO, a redirect identifier is included in the Extensions parameter. The redirect identifier indicates a receiving device to receive the RO. The redirect identifier may be a TMSI, IMSI, IP address or a phone number of the receiving device. If there is no redirect identifier in the Extensions parameter of the RO submit request message, the RO submit request message is determined as requesting return of the RO.

TABLE 1

| ROAP-RO submit request message | |
|---|---|
| Parameter | Mandatory/Optional |
| Device ID | M |
| RI ID | M |
| Device nonce | M |
| Protected ROs | M |
| Certificate chain | O |
| Extensions | O |
| Signature | M |

The RO submit response message is defined with reference to Table 2. The RO submit response message includes parameters such as Status, a Device ID, a Domain ID, an RI ID, a Device nonce and a Digital Signature.

The Status parameter indicates whether a corresponding RO has been transferred successfully in response to an RO submit request message. A Device ID included in the RO submit request message is used as the Device ID parameter. The Domain ID is an optional parameter. The RI ID is an RI ID included in the RO submit request message. An RI ID of the entity transmitting the RO submit response message may be used as the RI ID. A Device nonce included in the RO submit request message may be used as the Device nonce. A PKI method may be used as the digital Signature.

FIG. 3 illustrates a structure, content and syntax of an RO submit response message in accordance with one embodiment of the present invention. FIGS. 4A and 4B illustrate an RO submit request message coded using an XML (Extensible Markup Language). FIG. 5 illustrates an RO submit response message coded using XML.

As shown in FIGS. 4A and 4B, the redirect ID (Identifier) is included in the Extensions parameter of the RO submit request message and its value is '093210932091'. The RO submit request message is requesting transfer of RO to a receiving device having the value '093210932091'. The value may be a phone number of the receiving device or TMSI, with the use of TMSI illustrated.

TABLE 2

ROAP-RO submit response

| Parameter | Mandatory/optional |
| --- | --- |
| Status | M |
| Device ID | M |
| Domain ID | O |
| RI ID | M |
| Device nonce | M |
| Signature | M |

The RO submit response message illustrated in FIG. 5 is a response message to the RO submit request message illustrated in FIGS. 4A and 4B. The RO submit response message indicates that the RO has been successfully transferred.

The processing of RO in the DRM system in accordance with the present invention will be described with reference to FIGS. 6-11. One case is where unused RO or partially used RO related to digital contents are transferred to a different user, for example, a different device. A second case is where unused RO or the partially used RO are returned to the RI 20.

FIG. 6 illustrates a method for transferring unused RO or partially used RO to a different user in the DRM system.

When the first device 10 desires to transfer unused RO or a partially used RO to the second device 11, the first device 10 includes the unused RO or partially used RO in a Protected RO parameter of an RO submit request message and includes an identifier of the second device 11 as a redirect ID value in the Extensions parameter. In addition, the first device 10 includes an identifier of the first device 10 in the Device ID parameter, includes an identifier of an RI to receive the RO submit request message in the RI ID parameter, and fills values of other essential parameters. In this manner, the first device 10 generates the RO submit request message by filling all the parameter values of the Device ID, the RI ID, the Device nonce, the Protected ROs, the Extensions and the Digital signature.

The first device 10 transmits the generated RO submit request message to the RI 20 (step S10). Upon receiving the RO submit request message, the RI 20 checks whether the redirect ID value exists in the Extensions parameter of the RO submit request message. If the redirect ID value exists, the RI 20 recognizes that it should transfer RO corresponding to the Protected ROs parameter value to the receiving device corresponding to the redirect ID value and transmits an RO submit response message to the first device 10 (step S11). The RI 20 manages RO to be submitted in a corresponding storage unit (step S12).

The first device 10 receives the RO submit response message and, if the RO submit response message contains status information indicating successful processing of the RO submit request message, the first device 10 deletes the RO that the first device 10 intends to transfer to the second device 11 (step S13). The first device 10 may delete the digital contents together with the RO.

The RI 20 submits the RO to the second device 11 through a 1-path ROAP (Right Object Acquisition Protocol). If the second device 11 already has digital contents (the same digital contents as that of the first device 10) corresponding to the received RO and the RO have been successfully transferred to the second device 11, the RO transfer procedure to the second device 11 is terminated. If the second device 11 already has the digital contents, it indicates that the second device 11 has been registered for the RI 20.

Figure 7:
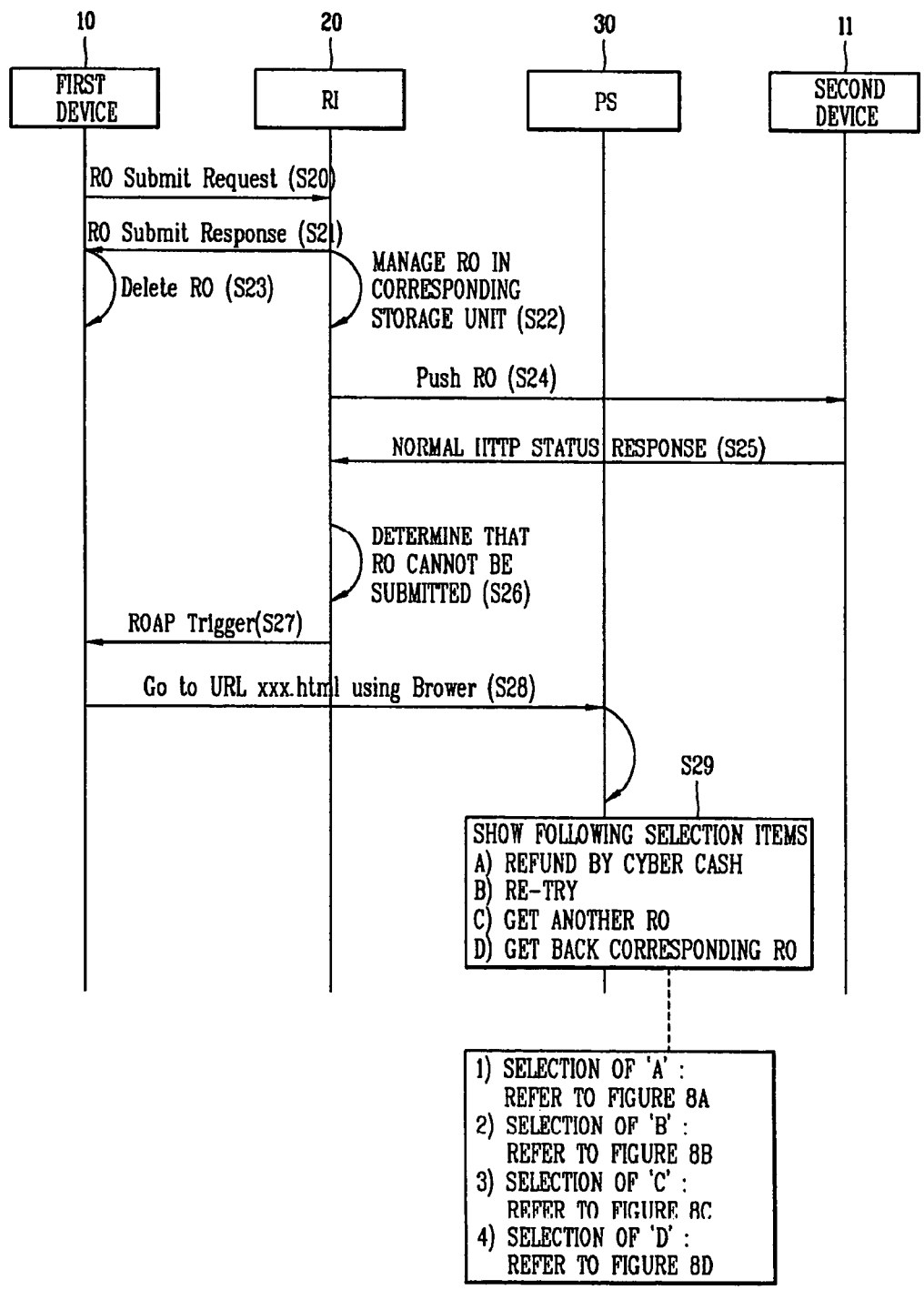
FIG. 7 illustrates a procedure in the DRM system when a rights issuer (RI) cannot successfully submit the RO to a receiving device.

FIG. 7 illustrates a processing procedure in the DRM system when a rights issuer (RI) cannot successfully transfer RO to a receiving device. Steps S20 to S23 are identical to steps S10 to S13 of FIG. 6, so their description is omitted.

The RI 20 checks whether it can transmit the RO that the first device 10 has requested to transfer to the second device 11. If the RO cannot be transmitted to the second device 11, the RI 20 determines that transfer of the RO cannot be successfully performed (step S26) and transmits a ROAP trigger to the first device 10 (step S27).

The RO may not be transmitted, for example, if the second device 11 is powered off, if the RI has transmitted the RO to the second device 11 through the 1-path ROAP (step S24) but there is no reception response from the second device 11, or if the RI receives a message that the RO cannot be received because a memory of the second device 11 is full (step S25). The ROAP trigger includes information indicating that the RO of the first device 10 cannot be transferred to the second device 11 or, if the first device 10 desired to return the RO, includes information indicating that a connection to a URL (Uniform Resource Locator) 'xxx.html' of the presentation server (PS) 30 is unavailable.

When the first device 10 is connected to the corresponding URL of the PS 30 (step S28), the PS 30 provides the first device 10 with a plurality of selection items (step S29). The plurality of selection items include refund by cyber cash, re-try, get another RO, and withdrawal (or get back) of the corresponding RO that the first device 10 desired to transfer. When the RO is returned by cyber cash, issued as another RO, or withdrawn, a withdrawn value, refunded value or newly issued RO may be the same value or a smaller value than the RO the first device desired to transfer to the second device 11.

As illustrated in FIG. 8A, when the first device 10 selects 'refund by cyber cash' (step S30), the PS 30 informs the RI 20 that the first device 10 desires a refund (step S31). The RI 20, which manages a cyber cash account of the first device 10, refunds the corresponding RO by cyber cash, reserves the refunded cyber cash in the cyber cash account of the first device 10, and informs the PS 30 regarding the reservation of the cyber cash (step S32).

The RI 20 informs the first device of the refund and transmits the ROAP trigger indicating an URL address of the PS 30 to the first device 10 for confirmation of the refund (step S33).

When the first device 10 is connected to the corresponding URL address of the PS 30 for confirmation of the refund (step S34), the PS 30 indicates the cyber cash value of the refund to the first device 10 (step S35).

As illustrated in FIG. 8B, when the first device 10 selects 're-try' (step S40), the PS 30 informs the RI 20 that the first device 10 wants to retry the transfer of the RO (step S41). The RI 20 again transmits the RO to the second device 11 through the 1-path ROAP (step S42). When the RO is successfully submitted to the second device 11, the RI 20 follows the procedure illustrated in FIG. 6 (step 43). Otherwise, the RI 20 follows the procedure illustrated in FIG. 7 (step S43).

Figure 8C:
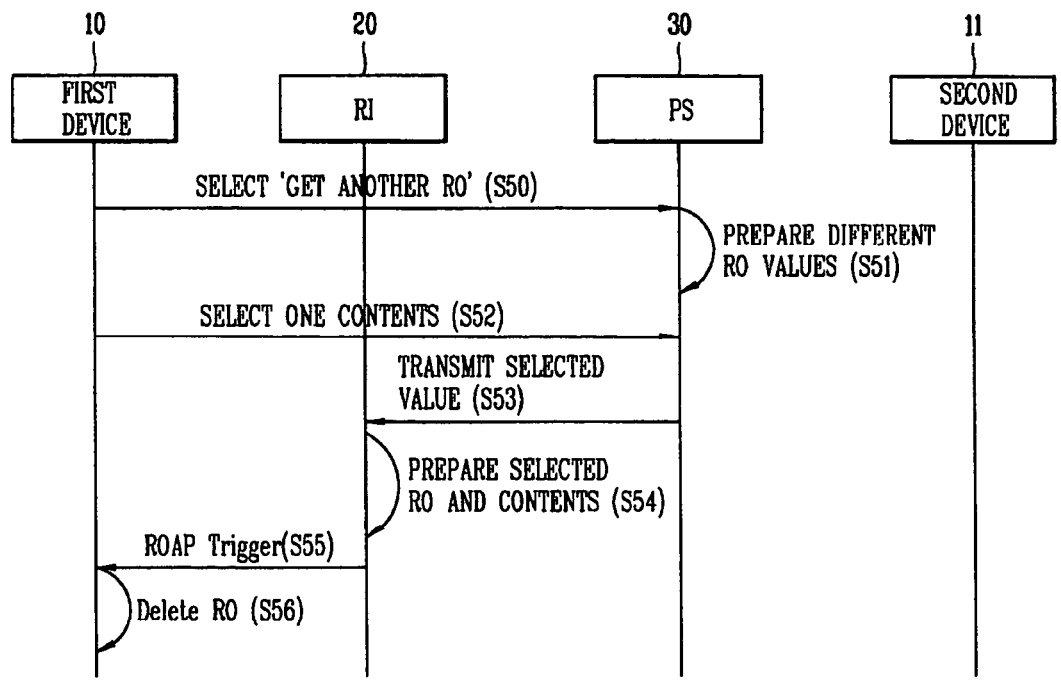
FIG. 8C illustrates a procedure when "GET ANOTHER RO" is selected in FIG. 7.

As illustrated in FIG. 8C, when the first device 10 selects 'get another RO' (step S50), the PS 30 prepares values of new digital contents and corresponding RO (step S51). Then, the first device 10 selects one digital content of the prepared values and a value for creating a corresponding RO (step S52). The PS 30 transmits the selected digital contents and the information for example, a cost to the RI 20 in order to create a corresponding RO (step S53). The RI 20 prepares the RO and the digital contents according to the received value (step S54).

The RI 20 transmits a ROAP trigger to the first device indicating different (new) RO and digital contents may be received (step S55). Then, the first device 10 deletes the RO that the first device 10 desired to transfer to the second device 11 (step S56).

The first device 10 performs a general 2-path ROAP procedure to receive the different RO and digital contents that have been selected. Specifically, the first device 10 requests the different RO from the RI 20 and the RI 20 issues the different RO to the first device 10 in response to the request from the first device 10.

Figure 8D:
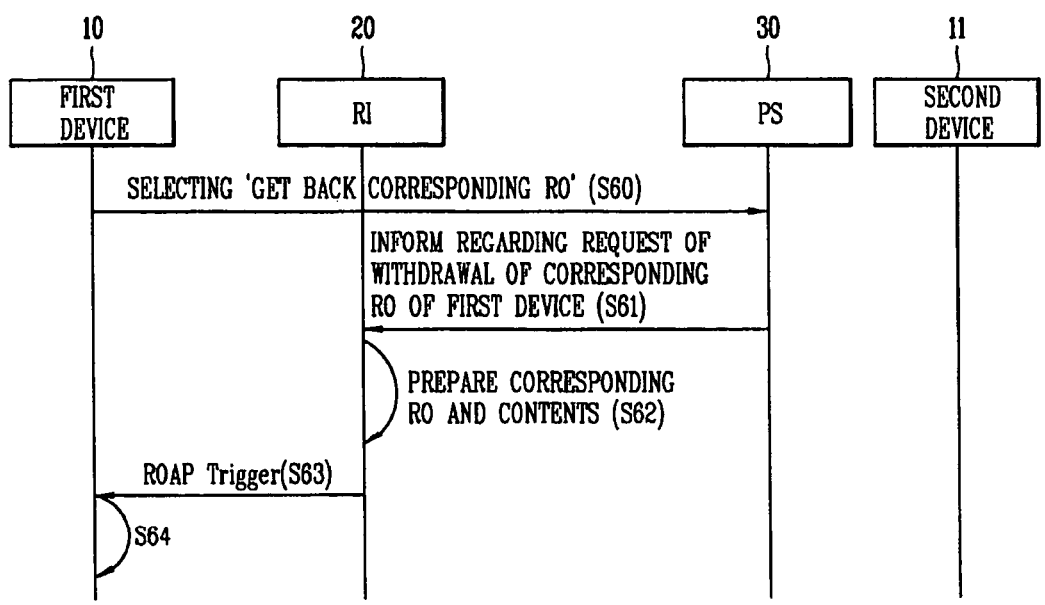
FIG. 8D illustrates a procedure when "GET BACK CORRESPONDING RO" is selected in FIG. 7.

As illustrated in FIG. 8D, when the first device 10 selects 'get back corresponding RO' (step S60), the PS 30 informs the RI 20 that the first device 10 desires to withdraw the corresponding RO (step S61). The RI 20 prepares the corresponding RO and digital contents (step S62) and the RI 20 transmits a ROAP trigger indicating withdrawal of the corresponding RO to the first device 10.

The first device 10 withdraws the corresponding RO by performing the general 2-path ROAP procedure. Specifically, the first device 10 requests that the RI 20 re-issue the RO that the first device 10 desired to transfer to the second device 11 and the RI 20 re-issues the corresponding RO to the first device 10.

Figure 9:
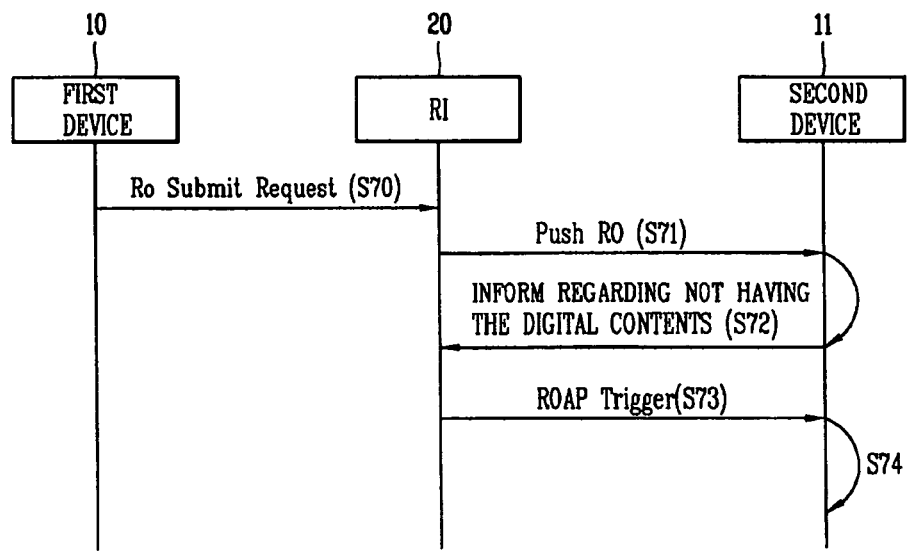
FIG. 9 illustrates a method for obtaining digital contents by a receiving device when the receiving device does not have the digital contents corresponding to RO received through the RI.

FIG. 9 illustrates a method for the receiving device to obtain digital contents when the receiving device does not have the digital contents corresponding to the RO received through the RI. The first device 10 transmits an RO submit request message to the RI 20 in order to request submission of unused RO or a partially used RO to the second device 11 (step S70). The RI 20 delivers the requested RO to the second device 11 through the 1-path ROAP (step S71).

Upon receiving the RO through the 1-path ROAP, the second device 11 checks whether it already has digital contents corresponding to the received RO. If the second device 11 does not have the digital contents, the second device 11 informs the RI 20 that it does not have the digital contents (step S72).

Then, the RI 20 checks whether the second device 11 has been registered and does not have the digital contents. If the second device II has not been registered and does not have the digital contents, the RI 20 transmits an ROAP trigger to the second device 11 to initiate a general registration procedure and general RO issuance procedure (step S73). Upon receiving the ROAP trigger, the second device 11 registers with the RI 20 according to the general registration procedure by using a general 4-path registration protocol, downloads the digital contents corresponding to the RO through the PS 30, and receives the delivered RO through the general 2-path ROAP (step S74).

Figure 10:
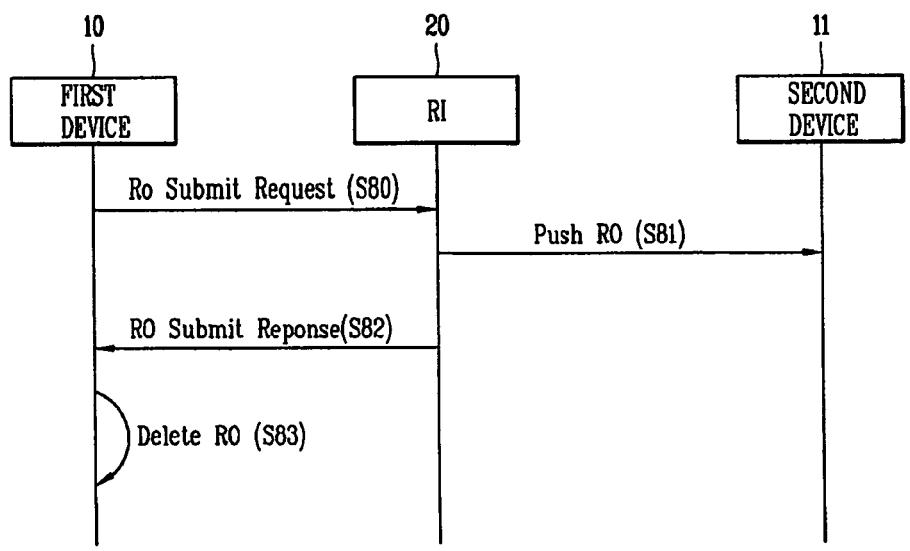
FIG. 10 illustrates another method for submitting RO in a DRM system in accordance with one embodiment of the present invention.

FIG. 10 illustrates another method for submitting RO in a DRM system in accordance with one embodiment of the present invention when the second device 11 already has the same digital contents as the first device 10. The first device 10 transmits an RO submit request message to the RI 20 in order to request transfer of an unused RO or a partially used RO to the second device 11 (step S80). The RI 20 submits the RO to the second device 11 through the 1-path ROAP (step S81). When the RO is successfully submitted, the RI 20 transmits an RO submit response message to the first device 10 (step S82). The transmission of the RO submit request message (step S80), the submission of the RO through the 1-path ROAP (step S81), and the transmission of the RO submit response message (step S82) are processed as one transaction.

When steps S80, S81 and S82 are successfully performed, the procedure for transferring the RO to the second device 11 is complete and the first device 10 deletes the RO that was transferred to the second device 11 (step S83). The first device 10 may also delete the corresponding digital contents.

Figure 11:
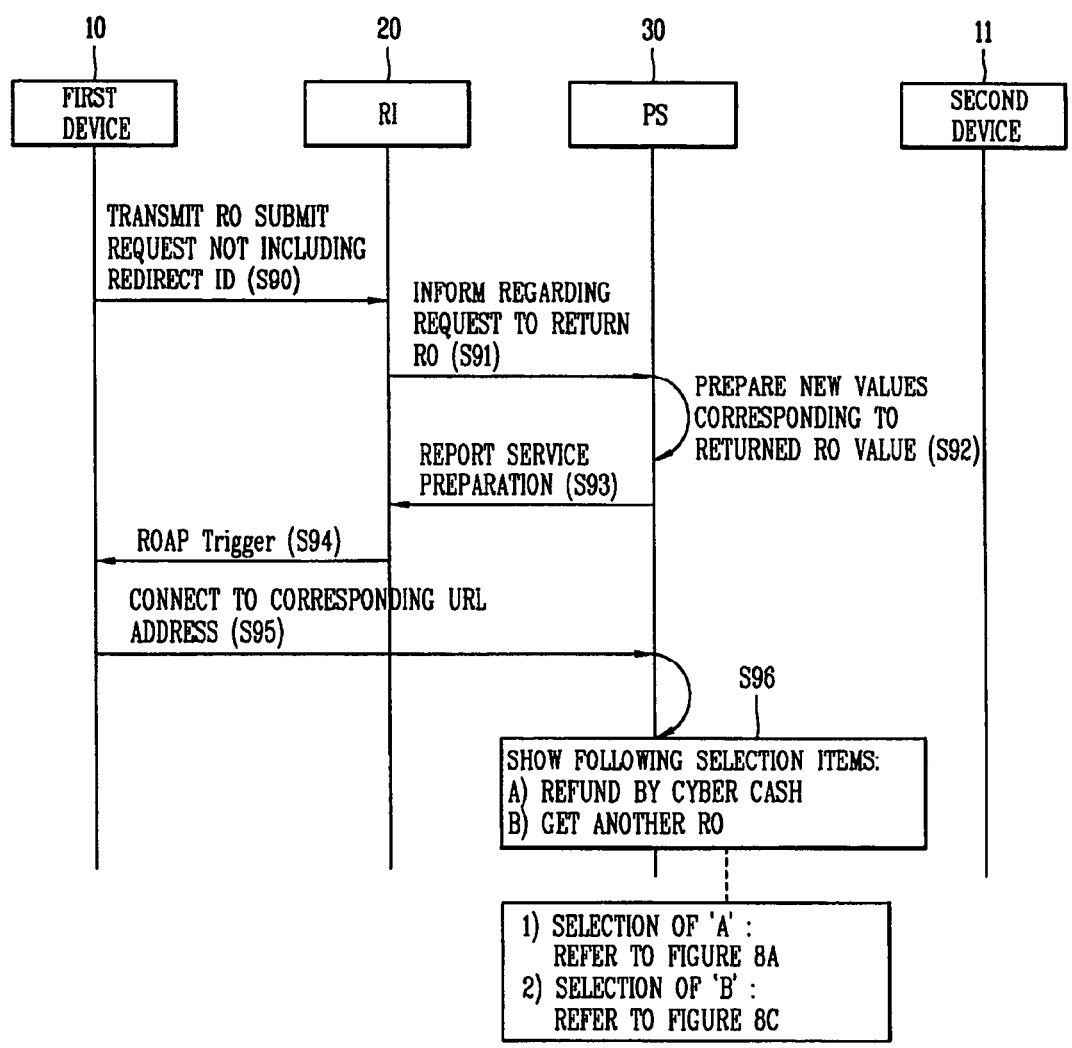
FIG. 11 illustrates a method for returning RO in a DRM system in accordance with one embodiment of the present invention.

FIG. 11 illustrates a method for returning unused RO or a partially used RO in the DRM system in accordance with one embodiment of the present invention. The first device 10 generates an RO submit request message not including the redirect ID and transmits the generated RO submit request message to the RI 20 (step S90).

Upon recognizing that the redirect ID is not contained in the received RO submit request message, the RI 20 determines that the RO submit request message is a request to return RO indicated in the message. The RI 20 informs the PS 30 that the first device 10 has requested to return the RO (step S91).

The PS 30 prepares return service and reports preparation of the return service to the RI 20 (step S93). The RI 20 then transmits a ROAP trigger to the first device 10 to instruct the first device 10 to connect to the PS 30 for return of the RO (step S94).

The first device 10 is connected to a corresponding URL address of the PS 30 according to the ROAP trigger (step S95). The PS 30 provides for selection by the first device 10 of either 'refund by cyber cash' for refunding cyber cash corresponding to a value smaller than the value of the return RO or 'get another RO' for receiving a new RO corresponding to the value smaller than the value of the return RO (step S96).

The first device 10 selects one of the selection items. If the first device 10 selects 'refund by cyber cash', a refunding operation is performed as illustrated in FIG. 8A. If the first device 10 selects 'get another RO', an operation to issue of a different RO is performed as illustrated in FIG. 8C.

As described herein, the message, method and system for processing RO in a DRM system in accordance with the present invention have advantages. Since a message for a first authenticated device to transfer partially used RO or unused RO related to digital contents to a second device or to request return of RO is facilitated, the first authenticated device may transfer the corresponding RO to the second device through the RI or return the corresponding RO to the RI. Furthermore, when the first authenticated device desires to transfer unused RO or a partially used RO to the second device through the RI, but the second device cannot receive the RO, the RI can instruct the first authenticated device to perform a procedure such as refunding, issuing a different RO, or withdrawing the RO. When the second device does not have digital contents corresponding to the RO, the RI can instruct the second device to perform a registration procedure, thereby increasing user convenience.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalants but also equivalent structures.

What is claimed is:

1. A method for processing access rights to digital content in a DRM (Digital Rights Management) system, the method comprising:
   transmitting, by a first device, a request message to a server, the request message indicating a transaction to be performed on at least one partially used rights object (RO) related to the digital content;
   uploading, by the first device, the at least one partially used RO to the server; receiving, by the server, the request message and the at least one partially used RO from the first device;
   analyzing, by the server, the request message by recognizing whether the request message includes an identifier of a second device;
   determining, by the server, the transaction to be performed based upon presence or absence of the identifier of the second device in the request message, the server recognizing that the identifier of the second device is present in the request message;
   determining, by the server, that the transaction is a transfer of the at least one partially used RO based upon the presence of the identifier of the second device in the request message;
   processing, by the server, the determined transaction, transferring the at least one partially used RO to the second device;
   receiving, by the first device, a response message from the server;
   recognizing, by the first device, that the received response message includes information indicating successful processing of the request message; and
   deleting, by the first device, the at least one partially used RO after confirming the successful processing of the request message,
   wherein the request message comprises:
   a device identifier identifying the first device;
   a device nonce;
   an identifier identifying the server receiving the request message; and
   information about the at least one partially used RO being transferred, and wherein the response message comprises:
   a device identifier identifying the first device;
   an identifier identifying the server;
   a status indicating whether the transaction was successful;
   a device nonce; and
   a signature.

2. The method of claim 1, further comprising:
   checking, by the server, whether the at least one partially used RO is transferrable to the second device;
   recognizing, by the server, that the second device is powered off, no reception response is received from the second device or a memory of the second device is full; and
   determining that the at least one partially used RO cannot be transferred to the second device.

3. The method of claim 1, further comprising:
   recognizing, by the server, that the second device already has the digital content corresponding to the received at least one partially used RO; and
   terminating, by the server, the transfer of the at least one partially used RO to the second device.

4. A method for processing access rights to digital content in a DRM (Digital Rights Management) system, the method comprising:
   transmitting, by a first device, a request message to a server, the request message indicating a transaction to be performed on at least one partially used rights object (RO) related to the digital content;
   uploading, by the first device, the at least one partially used RO to the server;
   receiving, by the server, the request message and the at least one partially used RO from the first device;
   analyzing, by the server, the request message by recognizing whether the request message includes an identifier of a second device;
   determining, by the server, the transaction to be performed based upon presence or absence of the identifier of the second device in the request message, the server recognizing that the identifier of the second device is absent in the request message;
   determining, by the server, that the transaction to be performed is a return of the at least one partially used RO based upon the absence of the identifier of the second device in the request message; and
   performing, by the server, a procedure for returning the at least one partially used RO;
   receiving, by the first device, a response message from the server;
   recognizing, by the first device, that the received response message includes information indicating successful processing of the request message; and
   deleting, by the first device, the at least one partially used RO after confirming the successful processing of the request message,
   wherein the request message comprises:
   a device identifier identifying the first device;
   a device nonce;
   an identifier identifying the server receiving the request message; and
   information about the at least one partially used RO being transferred, and wherein the response message comprises:
   a device identifier identifying the first device;
   an identifier identifying the server;
   a status indicating whether the transaction was successful;
   a device nonce; and
   a signature.

5. The method of claim 4, further comprising:
providing at least one return option to the first device.

6. The method of claim 5, further comprising:
   returning, by the first device, the at least one partially used RO in exchange for at least a partial refund of a cost for the at least one partially used RO.

7. The method of claim 5, further comprising:
performing, by the server, a cyber cash refund or issuance of at least one new RO in exchange for the at least one partially used RO returned by the first device.

8. The method of claim 7, wherein a value of the cyber cash and a value of the at least one new RO are the same as or less than a value of the at least one partially used RO.

9. The method of claim 5, further comprising:
performing, by the server, a cyber cash refund in exchange for the at least one partially used RO returned by the first device.

10. The method of claim 9, wherein a value the cyber cash refund is based on unused portion of the at least one partially used RO.

11. The method of claim 1, wherein the device identifier comprises a phone number.

12. The method of claim 1, wherein the device identifier comprises a TMSI (Temporary Mobile Subscriber Identity) or an IMSI (International Mobile Subscriber Identity).

13. The method of claim 1, wherein the device identifier comprises an IP address.

14. The method of claim 1, wherein the request message further comprises a digital signature.

15. The method of claim 14, wherein the digital signature comprises a Public Key Infrastructure (PKI) method.

16. The method of claim 1, wherein the request message is an RO submit request message.

17. The method of claim 1, wherein the server comprises a rights issuer (RI).

18. The method of claim 1, wherein the request message and the response message are coded using an XML (Extensible Markup Language).

19. A device comprising a memory storing digital content, wherein access rights to the digital content is processed in a DRM (Digital Rights Management) system and the device is configured to:
transmit a request message to a server, the request message indicating a transaction to be performed on at least one partially used rights object (RO) related to the digital content;
upload the at least one partially used RO to the server;
receive a response message from the server, the received response message including information indicating successful processing of the request message; and
delete the at least one partially used RO from the memory,
wherein the request message includes an identifier of another device in order to indicate that the transaction is a transfer of the at least one partially used RO to the another device, the request message further including an identifier of the device, a digital signature, an identifier identifying the server, and an identifier of the at least one partially used RO.

20. The device of claim 19, wherein the device is further configured to request the server to re-issue the at least one partially used RO to be transferred to another device.

21. A device comprising a memory storing digital content, wherein access rights to the digital content is processed in a DRM (Digital Rights Management) system and the device is configured to:
transmit a request message to a server, the request message indicating a transaction to be performed on at least one partially used rights object (RO) related to the digital content;
upload the at least one partially used RO to the server;
receive a response message from the server, the received response message including information indicating successful processing of the request message; and
delete the at least one partially used RO from the memory,
wherein the device is further configured to include an identifier of the device in the request message, a digital signature, an identifier identifying the server, and an identifier of the at least one partially used RO, excluding an identifier of another device or a redirect ID, in the request message in order to indicate that the transaction is return of the at least one partially used RO, the return transaction comprising returning the at least one partially used RO in exchange for a cyber cash refund or at least one replacement RO.

22. The device of claim 21, wherein a value of the cyber cash refund and a value of the at least one replacement RO are the same as or less than a value of the at least one partially used RO.

23. A system for processing access rights to digital contents in a DRM (Digital Rights Management) system, the system comprising:
a first device for generating and transmitting a request message, the request message indicating a transaction to be performed on at least one rights object (RO) related to accessing the digital contents; and
a rights issuer (RI) server comprising a processor; and
a memory connected to the processor storing executable instructions that when executed by the processor cause the processor to perform the steps of:
receiving, by the RI server, the request message including an RO;
analyzing, by the RI server, the request message;
recognizing, by the RI server, that the request message does not include a redirect identifier;
based on the recognition that the request message does not include the redirect identifier, determining, by the RI server, that the RI is receiving a request to return the RO indicated in the request message;
informing, by the RI server, a presentation server (PS) that the first device has requested to return the RO;
refunding, by the RI server, the corresponding RO by cyber cash;
reserving, by the RI server, the refunded cyber cash in a cyber cash account of the first device;
informing by the RI server, the PS regarding the reservation of the cyber cash;
transmitting, by the RI server, a RO acquisition protocol (ROAP) trigger to the first device comprising an URL address of the PS to the first device for confirmation of the refund; and
transmitting, by the RI server, the ROAP trigger to the first device to instruct the first device to connect to the PS for return of the RO.

24. A method for processing access rights to digital contents in a DRM (Digital Rights Management) system, the method comprising:
receiving, by a rights issuer (RI) sever, a request message including a rights object (RO);
analyzing, by the RI server, the request message;
recognizing, by the RI sever, that the request message does not include a redirect identifier;
based on the recognition that the request message does not include the redirect identifier, determining, by the RI server, that the RI is receiving a request to return the RO indicated in the request message;
informing, by the RI server, a presentation server (PS) that a first device has requested to return the RO;
refunding, by the RI server, the corresponding RO by cyber cash;

reserving, by the RI server, the refunded cyber cash in a cyber cash account of the first device;

informing, by the RI server, the PS regarding the reservation of the cyber cash;

transmitting, by the RI server, a RO acquisition protocol (ROAP) trigger to the first device comprising an URL address of the PS to the first device for confirmation of the refund; and transmitting, by the RI server, the ROAP trigger to the first device to instruct the first device to connect to the PS for return the RO.

25. A rights issuer (RI) for processing access rights to digital contents in a DRM (Digital Rights Management) system, the RI comprising:

a processor; and a memory connected to the processor storing executable instructions that when executed by the processor to the perform the steps of:

receiving, by the RI server, a request message including a rights object (RO);

analyzing, by the RI server, the request message;

recognizing, by the RI server, that the request message does not include a redirect identifier;

based on the recognition that the message does not include a redirect identifier, determining, by the RI server, that the RI is receiving a request to return the RO indicated in the request message;

informing, by the RI server, a presentation server (PS) that the first device has requested to return the RO;

refunding by the RI server, the corresponding RO by cyber cash;

reserving, by the RI server, the refunded cyber cash in the cyber cash account of the first device;

informing, by the RI server, the PS regarding the reservation of the cyber cash;

transmitting, by the RI server, a RO acquisition protocol (ROAP) trigger to the first device comprising an URL address of the PS to the first device for confirmation of the refund; and transmitting, by the RI server, the ROAP trigger to the first device to instruct the first device to connect to the PS for return of the RO.

* * * * *